United States Patent
Kutka et al.

[11] Patent Number: 5,933,541
[45] Date of Patent: Aug. 3, 1999

[54] METHOD FOR PROCESSING DECODED PICTURE BLOCKS IN A BLOCK-BASED METHOD OF PICTURE CODING

[75] Inventors: Robert Kutka, Geltendorf; Oliver Beider, Fuerstenfeldbruck; Philippe Wendling, Munich, all of Germany

[73] Assignee: Siemens Aktiengesellschaft, Munich, Germany

[21] Appl. No.: 08/699,154

[22] Filed: Aug. 16, 1996

[30] Foreign Application Priority Data

Aug. 17, 1995 [DE] Germany .................. 195 30 315
Feb. 5, 1996 [DE] Germany .................. 196 04 050

[51] Int. Cl.$^6$ .................. G06K 9/40; G06T 5/00
[52] U.S. Cl. .................. 382/261; 382/268; 382/266
[58] Field of Search .................. 382/268, 261, 382/264, 260, 250, 275; 348/420, 403, 407, 607, 416, 699; 358/433, 463, 444

[56] References Cited

U.S. PATENT DOCUMENTS

| | | |
|---|---|---|
| 4,754,492 | 6/1988 | Malvar . |
| 4,941,043 | 7/1990 | Jass .................. 348/420 |
| 5,138,672 | 8/1992 | Hirabayashi et al. .......... 382/264 |
| 5,218,649 | 6/1993 | Kundu et al. . |
| 5,245,445 | 9/1993 | Fujisawa .................. 382/261 |
| 5,367,629 | 11/1994 | Chu et al. . |
| 5,473,441 | 12/1995 | Inuiya et al. .................. 348/607 |
| 5,654,759 | 8/1997 | Augenbraun .................. 348/420 |
| 5,724,098 | 3/1998 | Murakami et al. .................. 348/416 |

FOREIGN PATENT DOCUMENTS

| | | |
|---|---|---|
| 0 577 350 A2 | 10/1990 | European Pat. Off. . |
| 0 502 622 A1 | 9/1992 | European Pat. Off. . |
| 0 526 885 A2 | 2/1993 | European Pat. Off. . |
| 0526 885 A2 | 2/1993 | European Pat. Off. . |
| 2 253 318 | 9/1992 | United Kingdom . |

OTHER PUBLICATIONS

IEEE Transactions on Consumer Electronics, "Post–Filtering Methods for reducing Blocking Effects from Coded Images", vol. 40, No. 3, 1994, pp. 521–526, XP000471215, Jarske et al.

"Overview of the PX64 KBIT/S Video Coding Standard", Communications of the ACM, vol. 34, No. 4., S. 60–63, M. Liou, Apr. 1991.

"The JPEG Still Picture Compression Standard", Communications of the ACM, vol. 34, No. 4, S. 31–44, G. Wallace, Apr. 1991.

"International Standardization on Picture Coding", IEEE Transactions, vol. E74, No. 3, S. 533–538, S. Okubo et al., Mar. 1991.

"A Video Compression Standard for Multimedia Applications", Communications of the ACM, vol. 34, No. 4, S. 47–58, D. Le Gall, Apr. 1991.

*Primary Examiner*—Scott Rogers
*Attorney, Agent, or Firm*—Hill & Simpson

[57] ABSTRACT

The present invention relates to a method of filtering edges of a picture block with an edge-smoothing filter. The selection of the edge-smoothing filter depends on the size of the movement vector associated with each picture block BV to clarify the picture image and increase image quality. Alternatively, the selection of the edge-smoothing filter depends on the picture quality or both picture quality and the movement vector.

12 Claims, 2 Drawing Sheets

METHOD FOR PROCESSING DECODED PICTURE BLOCKS IN A BLOCK-BASED METHOD OF PICTURE CODING

BACKGROUND OF THE INVENTION

1. Field of the Invention

The present invention relates generally to the field of image data processing, and, more particularly, the present invention relates to an improved method for processing decoded picture blocks.

2. Description of the Related Art

In known systems, if video data is compressed by coding methods based on transformation codings, errors in certain picture areas inevitably occur. For example, the use of the discrete cosine transformation for motion pictures at an extremely low transmission rate of approximately 8 to 112 kbit/s, such as that used with mobile radio telephone applications and video phone applications results in picture errors.

The picture errors manifest themselves in artificial edges of block borders and noise or other fuzziness. These coding errors have a disturbing effect for the viewer and distort the overall picture image. Artificial edges at block borders are a problem which occurs with all block-based coding methods. These artificial edges significantly reduce the image quality for the viewer. Other undesirable effects also appear in motion picture errors of a picture sequence which is referred to as video data current.

U.S. Pat. No. 5,367,629 describes a method wherein decoded picture blocks are stored and the picture block edge pixels are filtered with an edge-smoothing filter. One disadvantage of this method is that for each picture block, the same edge-smoothing filter is used and block-border filtering adapted to the characteristics of the picture block is not possible. This results in degradation of the picture quality during reproduction which is less desirable than that which is capable of being achieved with the present invention.

U.S. Pat. No. 4,754,492 discloses alternate methods for block-based picture-coding methods. The methods disclosed in this reference similarly fail to produce the improvements in image quality which are capable of being achieved through the present invention.

SUMMARY OF THE INVENTION

The present invention provides a method which smooths the artificial edges at block borders of picture blocks in a block-based coding method. This invention achieves significantly improved image quality by filtering to achieve better image reproduction. The total impression of the picture for a viewer is considerably improved by smoothing the artificial edges at the block borders of all picture blocks for a picture which is coded by a block-based picture coding method. In the present invention, each picture block is filtered with an edge-smoothing filter adapted to the specific characteristics of the respective picture block.

In an alternate embodiment, the method of the present invention smooths defects in the moving areas of the picture sequence in addition to smoothing the edges of the block borders. The present invention employs the selection of different edge-smoothing filters for different picture blocks which are selected based on information about the picture quality. For example, a quantizing parameter is used as a measure of picture quality. This is particularly advantageous for use in conjunction with the transmission of video phone sequences at varying transmission rates. The selection of the edge-smoothing filter can be advantageously adapted in this manner. Furthermore, the present invention contemplates selecting the edge-smoothing filters depending on both the picture quality and the size of the movement vector. The selection of edge-smoothing filters for the edges of two adjacent picture blocks employs two directly adjoining edges of a common edge-smoothing filter which results in the maximum filter property for use with independent selection of the two blocks. A preferred exemplary embodiment of the present invention is described in more detail below with reference to the drawings wherein:

DETAILED DESCRIPTION OF THE PREFERRED EMBODIMENTS

A preferred exemplary embodiment of the present invention will be described with reference to the figures. Those skilled in the art will understand that the claimed invention is not limited to block-based picture coding and it is not limited to block-based methods which exclusively use the discrete cosine transformation for encoding the picture information. Furthermore, the present invention is independent of the block size used for the block-based coding method.

Figure 1:
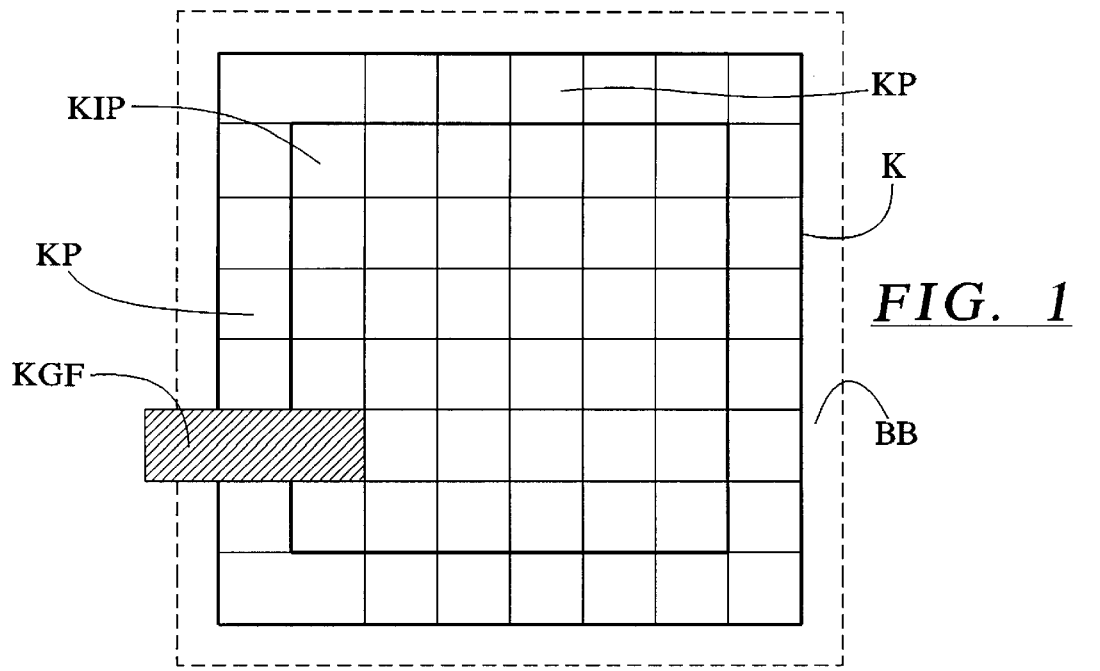
FIG. 1 is a diagram which illustrates filtering of pixels at a block border with a edge-smoothing filter.

FIG. 1 illustrates a picture block BB. The picture block BB is a small portion of a picture which is coded with a block-based method for picture coding. Prior to filtering the picture block BB, the picture block BB is initially stored 1. Block-based methods for picture coding are known in the art and comprise methods such as, for example, MPEG, JPEG, H.261 or H.263 (Ming Liou, overview of the px64kbit/s Video Coding Standard, Communications of the ACM, Vol. 34, No. 4, p. 60–63, April 1991; G. Wallace, The JPEG Still Picture Compression Standard, Communications of the ACM, Vol. 34, No. 4, pp. 31–34, April 1991; S. Okubo et al., International Standardization on Picture Coding, IEEE Transactions, Vol. E, 74, No. 3, p. 533–538, March 1991; D. LeGall. The A Video Compression Standard for Multimedia Applications, Communications of the ACM, Vol. 34, No. 4, p. 47–58, April 1991). However, as noted above, the method of the present invention is not limited to the above-mentioned block-based picture coding methods. Those skilled in the art will recognize the method of the present invention can be applied to any block-based picture coding method.

Each picture block BB has n×n pixels (picture elements), whereby the number n of the pixels which the picture block BB has is any natural number. For example, in using the MPEG, the block size, that is to say the number n of pixels which the picture block BB has is 8. As noted above, artificial edges occur through the use of this coding method, most notably at the block borders of the picture block BB. The block borders are formed at the picture block BB by edge pixels KP. The edge pixels KP of an edge K are filtered by an edge-smoothing filter KGF so that the edges K are smoothed. The structure of the edge-smoothing filter KGF is not subject to any restrictions and may be of any design. It is only important that the edge-smoothing filter KGF smooths the edges K. Possible filter structures TP1 and TP2 which can be used as edge-smoothing filter KGF are shown in FIGS. 6A and 6B and in FIG. 7 in the form of a transmission function H(f) depending on a frequency f.

Those skilled in the art will appreciate that the low-pass filter shown in no way restricts the general application of the present invention and are merely shown for the purposes of example. As shown above, any type of filter can be used as an edge-smoothing filter KGF if the filter has the appropriate edge-smoothing property for smoothing an edge K.

Figure 6A:
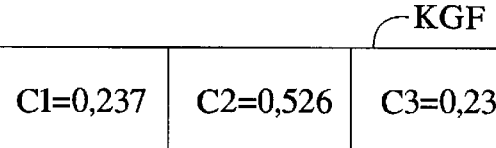
FIGS. 6A and B illustrate coefficients for two suitable edge-smoothing filters.
Figure 6B:
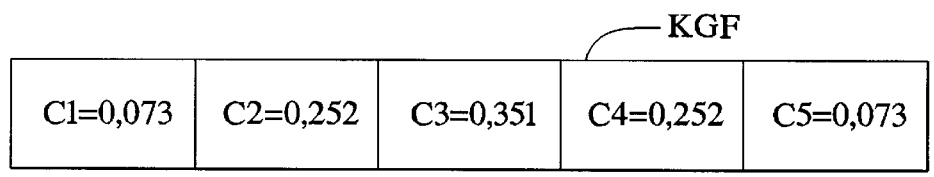

The filter TP1 shown in FIG. 6A has the following coefficients:
$C1=0.237$
$C2=0.526$
$C3=0.237$ Filter TP2 shown in FIG. 6B has the following coefficients:
$C1=0.073$
$C2=0.252$
$C3=0.351$
$C4=0.252$
$C5=0.073$ The selection of filter structure is also not particularly important to the method of the present invention. Both linear and non-linear filters may be used as the edge-smoothing filter KGF so long as the filter smooths the edge K. If a linear, one-dimensional filter mask is used, as shown in FIG. 6A, it is advantageous to guide the filter mask FM across the edge pixels KP which are to be filtered. This is done in such a manner that the filter mask FM is guided perpendicular to the edge K which is to be filtered.

If a two-dimensional filter mask is used as an edge-smoothing filter KGF, selection of the edge-smoothing filter KGF, it is noted that the property of the edge-smoothing filter K is maintained. The characteristics of the filters shown in FIGS. 6A and 6B and in FIG. 7 which can be used as edge-smoothing filters KGF have found to be advantageous in experiments. However, filters having other characteristics for use as edge-smoothing filters KGF is also possible and understood by those skilled in the art. The determination of the particular is subjective and dependent upon the impression that the resultant filter picture generates for a viewer.

Figure 2:
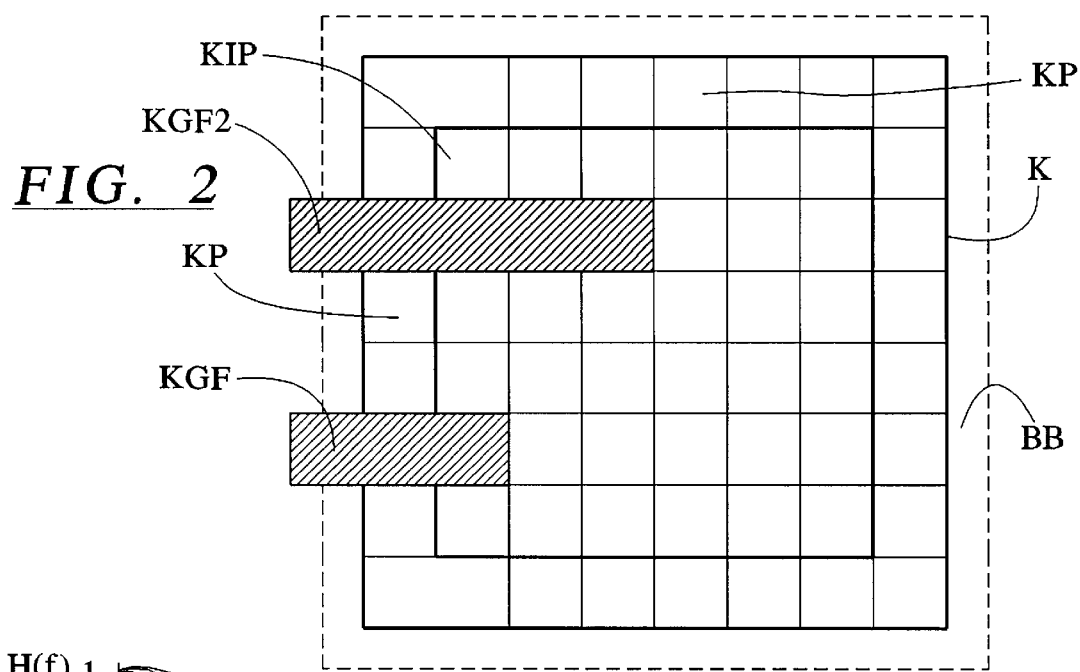
FIG. 2 is a diagram which illustrates the filtering of pixels at direct block borders of a pixel block in addition to filtering of pixels which are located further in from the edges with an additional edge-smoothing filter.

FIG. 2 illustrates that it is possible not only to filter the edge pixels KP which are located directly at the edge K, but also to filter inner edge pixels KIP located further toward the center of the picture block BB. This is accomplished with a second edge-smoothing filter KGF 2. The second edge-smoothing filter KGF 2 can be the same edge-smoothing filter KGF which is used to filter the edge pixels KP. This, however, is not a requirement.

In selecting the second edge-smoothing filter KGF2, it should be noted that the filtering of the inner edge pixels KIP should not become too great such that the detailed information of the picture which is located in the inner pixels of the block BB becomes blurred. The method described above wherein filtering of edge pixels KP and additionally inner edge pixels KIP is accomplished for each picture block BB of a picture. The method of the present invention may also advantageously be used to improve the viewer's impression of the picture quality which is degraded by additional defects which arise through movement in the picture area. This movement may be characterized in block-based methods for each picture block BB by movement vector BV. As a general rule of thumb, it can be stated that the greater the movement of a picture area within a picture sequence, that is the greater the movement vector BV for a respective picture block BB, the more strongly the edge K the picture block BB can be recognized. This edge K has a disturbing influence on the total impression for the picture viewer.

The intensification of the edge K through the movements of picture areas can be countered with an edge-smoothing filter KGF for each picture block BB which is selected depending on the size of the movement vector BV4. The selection of the edge-smoothing filter KGF follows the rule of thumb: the larger the movement vector BV, the greater the filter property of the edge-smoothing filter KGF which is to be used for the respective picture block BB. The table set forth below shows a possible allocation for the size of the movement vector BV for a picture block BB and of the edge-smoothing filter KGF to be used for the picture block BB.

| Movement Vector | Filter |
| --- | --- |
| 0 | No filtering |
| >0 and <5 | TP1 |
| > = 5 | TP2 |

Figure 7:
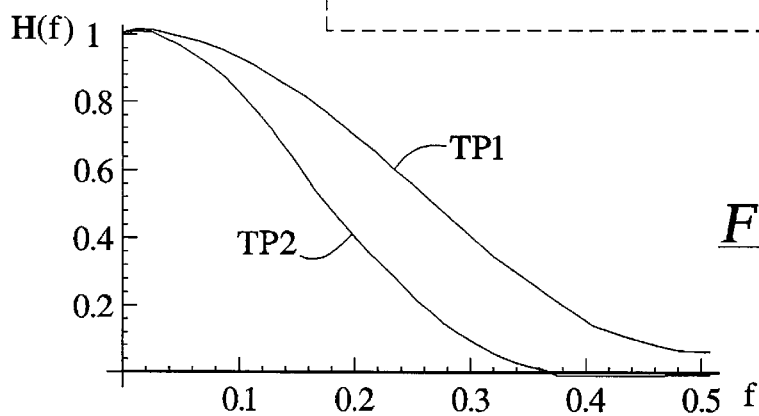
FIG. 7 is a diagram which illustrates the transmission function of the edge-smoothing filters represented in FIGS. 6A and 6B.
Figure 3:
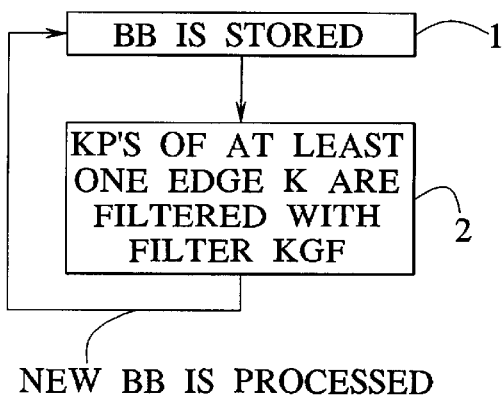
FIG. 3 is a flow diagram which illustrates the improved process of filtering images of the present invention.
Figure 4:
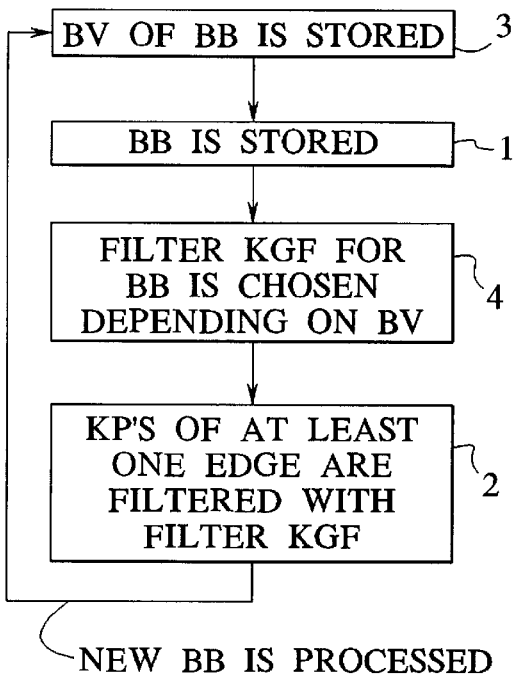
FIG. 4 is a flow diagram which illustrates the method for selecting an edge-smoothing filter for each individual picture block depending on the movement vector associated with the picture block.
Figure 5:
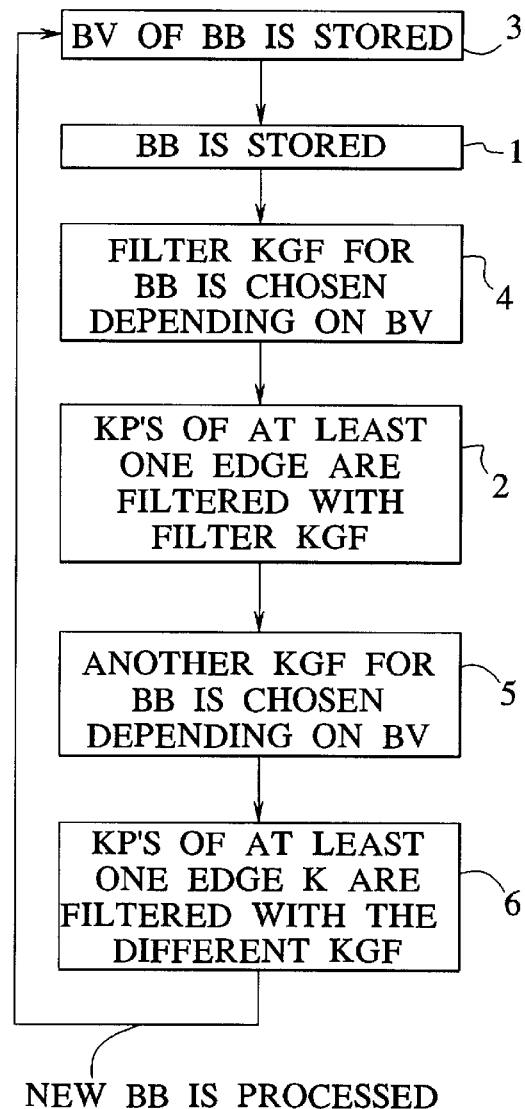
FIG. 5 is a flow diagram which illustrates a method of the present invention wherein additional filtering of inner block pixels is accomplished with at least one additional edge-smoothing filter.

The corresponding filters TP1 and TP2 are shown in FIG. 7 with their characteristic transmission function H(f). However, the values shown for the movement vector BV do not limit the general validity of the use of the general rule of thumb described above and only describes one possible solution of many which have been found experimentally. It is also contemplated that other characteristics are known to those skilled in the art and may easily be applied.

In this regard, it is only important in the development of the method for selecting edge-smoothing filter KGF for each picture block BB, there is the possibility of making the selection of the filter dependent on the size of the movement vector BV wherein the intensification of the edges K is counteracted by movement in temporally successive picture areas. The selection of various filters depending on the movement vector BV as edge-smoothing filters KGF for each picture block BB can also be applied in the selection n of the second edge-smoothing filter KGF2 in the development of the method shown in FIG. 2. However, the selection of various edge-smoothing filters KGF is not required to take place for each picture block, but this may be done. For example, selection may be done once for a macro-block MB which is comprised of several picture blocks BB, or, alternatively, selection may be done individually for each edge K of the picture block BB 6.

It is also advantageous to control the selection of the various filters as edge-smoothing filters KGF based on the picture quality used during transmission. In such a process it is possible that the selection of edge-smoothing filters KGF is automatically adapted to changing picture quality by adjusting transmission rates. Information about the picture quality of a picture to be decoded is usually indicated by a quantizing parameter Q in block-coding methods. The quantizing parameter Q indicates the neutral step resolution values of the corresponding picture block BB which are transmitted after coding transformation. For the known video phone standard H.263 quantizing parameter Q=1 signifies the highest possible resolution of the neutral steps and the value of the quantizing parameter Q=31 signifies the highest possible resolution of the neutral steps and the value of the quantizing parameter Q=31 signifies the lowest possible resolution of the possible steps.

In this manner, the quantizing parameter Q directly provides information about the quality of the picture block BB shown at the receiver. The selection of the edge-smoothing filter KGF for each picture block BB is controlled depending on the quantizing parameter Q. In this respect, the strength of the low-pass filter TP is increased with the reduction of the neutral step resolution of the picture. This is for the video standard H.263 which has a growing quantizing parameter Q. For example, the following control curve has been found to be advantageous for selecting the edge-smoothing filter KGF. The control curve, however, does not limit the general validity of the principal described above. No filtering is performed with a quantizing value between 1 and 7. If the value of the quantizing parameter is between 7 and 14, a weak low-pass filter is selected. For example, the weak low-pass filter having the filter structure shown in FIG. 6A is used having the following coefficients:

$C1=0.25$
$C2=0.5$
$C3=0.25$

If the quantizing parameter Q has a value between 14 and 23, an average low-pass filter is selected. The structure of this filter is the same as that of the first low-pass filter TP1 shown in FIG. 6A, and the three coefficients of the average low-pass filter are set forth below as:

$C1=0.333$
$C2=0.333$
$C3=0.333$

If the value of the quantizing parameter Q is between 23 and 31, a strong low-pass filter is selected which has 9 coefficients. The structure of the low-pass filter corresponds to the low-pass filter shown in FIG. 6B but it is extended in each case by 1 coefficient on each side. The resulting coefficients are, for example:

$C1=0.015$
$C2=0.063$
$C3=0.129$
$C4=0.188$
$C5=0.211$
$C6=0.188$
$C7=0.129$
$C8=0.063$
$C9=0.015$

Additionally, it is advantageous to use the combination of picture quality and size of the movement vector BV as a selection criterion for the edge-smoothing filter KGF. In this aspect of the present invention, with a movement vector BV=0, it is advantageous that the filter is reduced by one strength of filter type according to the picture quality described above. This means that with the selection of an average low-pass filter exclusively depending on picture quality, that is to say the quantizing parameter Q, that with the movement vector BV having a value 0, instead of an average low-pass filter, a weak low-pass filter is to be selected.

If the movement vector BV has a value between 0 and 10, the selection of the edge-smoothing filter KGF is done exclusively depending on the quantizing parameter Q. If the movement vector BV has a value greater than 9, the strength of the filter type depends on the quantizing parameter Q alone and is increased by 1.

This means, for example, that with use of a weak low-pass filter, depending on the quantizing factor and movement vector BV greater than 9, an average low-pass filter would be used. Furthermore, it is advantageous with edges of two picture blocks that directly adjoin each other to use the edge-smoothing filter KGF to filter these two directly adjoining edges. The filter is selected which has the greatest filtering property and which is selected when the edges are viewed independently.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method of decoding picture blocks comprising the steps of:
   filtering edge pixels of at least one edge of a picture block with a first edge-smoothing filter;
   filtering an edge of a second picture block using a second edge-smoothing filter having a filter characteristic different from the first edge smoothing filter wherein the step of filtering with a first edge-smoothing filter comprises filtering with an edge-smoothing filter which is selected depending on a movement vector of the picture block and wherein a strength of the edge-smoothing filter increases with an increase in the movement vector.

2. The method of decoding picture blocks according to claim 1; comprising a step of guiding a one-dimensional filter mask of the first edge-smoothing filter across the at least one edge such that it is positioned vertically across the edge.

3. The method of decoding picture blocks according to claim 1 wherein the step of filtering comprises filtering with a two-dimensional filter mask of the edge-smoothing filter.

4. The method of decoding picture blocks according to claim 1, further comprising a step of filtering edges within the picture block which adjoin an edge of another block.

5. The method of decoding picture blocks according to claim 4, further comprising the step of filtering inner edge pixels with the first edge-smoothing filter.

6. The method of decoding picture blocks according to claim 1 comprising the step of filtering two directly adjoining edges of two adjacent picture blocks with the first edge smoothing filter.

7. A method of decoding picture blocks comprising the steps of:

filtering edge pixels of at least one edge of a picture block with a first edge-smoothing filter;

filtering an edge of a second picture block using a second edge-smoothing filter having a filter characteristic different from the first edge smoothing filter, wherein the step of filtering with a first edge-smoothing filter comprises filtering with an edge-smoothing filter which is selected depending on a picture quality of the picture block and wherein the strength of the edge-smoothing filter increases as the picture quality decreases.

8. The method of decoding picture blocks according to claim 7, comprising a step of guiding a one-dimensional filter mask of the first edge-smoothing filter across the at least one edge such that it is positioned vertically across the edge.

9. The method of decoding picture blocks according to claim 7, wherein the step of filtering comprises filtering with a two-dimensional filter mask of the edge-smoothing filter.

10. The method of decoding picture blocks according to claim 7, further comprising a step of filtering edges within the picture block which adjoin an edge of another block.

11. The method of decoding picture blocks according to claim 10, further comprising the step of filtering inner edge pixels with the first edge-smoothing filter.

12. The method of decoding picture blocks according to claim 7, comprising the step of filtering two directly adjoining edges of two adjacent picture blocks with the first edge smoothing filter.

* * * * *